United States Patent

Bernard et al.

[11] 3,888,491
[45] June 10, 1975

[54] ELECTRONIC CHESS BOARD AND DISPLAY SYSTEM

[75] Inventors: Harvey B. Bernard, Reading; Karl H. Dolle, Swarthmore, both of Pa.

[73] Assignee: Harvey B. Bernard, Reading, Pa.

[22] Filed: Mar. 19, 1974

[21] Appl. No.: 452,620

[52] U.S. Cl......... 273/136 A; 340/323; 340/324 M; 340/337
[51] Int. Cl. .............................................. A63f 3/02
[58] Field of Search ..... 273/130 AB, 131 A, 136 A; 340/323, 337, 324 M, 343, 344, 225

[56] References Cited
UNITED STATES PATENTS

| | | | |
|---|---|---|---|
| 2,356,057 | 8/1944 | Householder | 273/136 A X |
| 2,877,019 | 3/1959 | Keister | 340/323 X |
| 3,654,392 | 4/1972 | Beinhocker et al. | 273/136 A X |

FOREIGN PATENTS OR APPLICATIONS

| | | | |
|---|---|---|---|
| 1,107,552 | 3/1968 | United Kingdom | 273/138 A |

Primary Examiner—Anton O. Oechsle
Attorney, Agent, or Firm—Paul & Paul

[57] ABSTRACT

An electronic system for the remote transmission and display of game moves in real time is provided in which one or more electronic board game consoles are provided, each having a 64-square chess board. Positioned beneath each of the 64 squares on each console, there is located a display unit which on proper energization is capable of producing a display image of any one of the game playing pieces. Logic circuitry is provided to permit each player of the game to selectively cause his images to be automatically transferred from one square to another as well as to selectively create or eliminate those piece images at preselected squares. Logic circuitry is further provided in which a plurality of board square memory elements, at least one for each square of the board, store coded representations of the playing piece images, and wherein said representations are monitored by decoding devices which facilitate the display of a given piece image at a given square. Additional logic circuitry is provided comprising at least one temporary storage memory element serving as a temporary storage for the coded representation of a playing piece transferred from one square to another, while an enabling circuit is provided to permit the transfer of an image only to those destination squares either at which no image is currently displayed, or at which an image belonging to an opposing player is displayed.

9 Claims, 6 Drawing Figures

ELECTRONIC CHESS BOARD AND DISPLAY SYSTEM

FIELD OF THE INVENTION

This invention relates to a system and apparatus for displaying successive moves on a game board or on a display board and more particularly to displaying on a chess board or on an enlarged display board not only the position of the various chess pieces on the board for both the white and black pieces, but also to selectively display changes in the position of such pieces in response to "moves" made by either the white side or the black side.

BACKGROUND OF THE INVENTION

For many years it has been recognized that the display of the various pieces and their positions in the game of chess presents a number of problems stemming from the severely limited nature of the known display systems. In its traditional form the game of chess is played using a display system which is purely physical in nature with the contestants physically moving the various chess pieces to the appropriate squares on a chess board and removing the chess pieces from the board where this is indicated, as in the case of capturing. Likewise, for display on an enlarged demonstration board, it has been necessary to operate the board manually. Consequently, the physical presence of the chess player or the display board operator has been necessary, and direct participation in the display operation from a remote location has not heretofore been possible in the playing of the game of chess or in display board operation. This dependence on the moving of a physical object, such as a chess piece, is characteristic of many of the systems heretofore proposed and in those few cases where this limitation has been eliminated, further difficulties and complexities have been introduced which have stood in the way of a system in which one individual at a single console is provided with means for displaying all of the pieces and their positions and for changing the display of such positions at will from a remote location. These difficulties have stood in the way of satisfactorily playing the game of chess where the players are located at positions remote from each other.

SUMMARY OF THE INVENTION

Utilizing the system of the present invention, provision is made for playing the game of chess between players remotely located from each other and in real time without the necessity of either player physically moving any chess pieces and, in fact, without the necessity of utilizing any physically movable chess pieces. In addition, the system of the present invention provides a means of displaying, at a remote location, the changing positions of chess piece representations in order to demonstrate positions as in the case of teaching the game.

The operative unit of the novel system of the present invention consists of an electronic console in the form of 64 separate squares forming a chess board in which each square is provided with a transparent portion. Positioned beneath the transparent portion of each square is a display unit capable of selectively displaying a representation of any selected chess piece and at the same time being capable of displaying a distinctive representation to distinguish a black piece display from a white piece display. Since no chess pieces are positioned at any time on any of the squares of the chess board, each square is available for incorporating an operative switching element for momentarily closing an electrical circuit as hereinafter described.

In the playing of a game of chess between two contestants remotely located from each other, each player would be provided with such a console and each player would be able to energize the display representation on the other player's console board, as well as on his own board, by the appropriate momentary closing of the switches associated with the squares on his own board. This interaction between the console boards is accomplished through the use of logic circuitry which operates to energize the appropriate elements of the display units positioned below or as a part of the individual chess squares of the consoles.

Underlying each of the 64 squares of each console board there is located a display unit which on proper energization is capable of producing a display image of any one of the six men used in the game of chess, namely, pawn, rook, knight, bishop, queen and king. One means for accomplishing this is to mount a multi-cathode tube, such as the well known "Nixie" tube beneath each square. The Nixie tube is a well known gas-discharge device having a plurality of shaped-metal cathodes stacked one behind the other. The anode consists of a fine metal mesh. The cathode-anode assembly is mounted inside a glass envelope containing neon plus a small amount of mercury. In the practice of the present invention, each Nixie tube is provided with seven cathode elements shaped, respectively, in the form of the six chess pieces, plus one cathode in the form of an ellipse. Each Nixie tube is horizontally mounted and, therefore, the shaped-metal cathode elements are positioned one beneath the other as viewed by the players. On application of a suitable voltage between the anode and any cathode, the gas surrounding that cathode breaks down and emits light, thus presenting a luminous image corresponding to the selected chess piece. The voltage required is of the order of 180 volts which in the present invention is supplied through suitable drivers as shown in FIG. 6. The desired piece display at any selected square may, therefore, be presented by energizing the appropriate cathode, and thus each player will be provided with information as to the occupancy of a given square by a given chess piece. In the case of the display of a black piece an identifying cathode is also energized which may be in the form of an ellipse as shown in FIG. 2. A vacant square will be indicated by the absence of a display image. It will thus be seen that the energized display images of the present invention will take the place of the chess pieces which must be physically moved in the traditional chess form. Moreover, the various positions and changes in positions of the chess pieces will automatically be displayed on the console board of both players by the selective operation by either player of the means associated with the individual squares of the console boards as hereinafter described. In addition, the present invention includes means for setting up the starting position at each console board in order to cause the proper display to appear at the appropriate squares corresponding to the starting positions in the pieces. Provision is also made for displaying a warning signal to indicate any attempt to make illegal or impossible moves. It will thus be seen that the system of the present invention provides means for establishing displays of the pieces for the starting position in the game of chess and for displaying changes in such positions as the game progresses, so that the entire game may be played with the players remotely located from each other, without the necessity of any physical movement of any chess piece by either player from the time the game is set up until it is finally completed. More specific details as to how the system is operated to accomplish the above are hereinafter set forth through reference to the appended drawings.

DESCRIPTION OF THE DRAWINGS

The present invention will be more fully understood from the following detailed description which has reference to the accompanying drawings in which.

DETAILED DESCRIPTION OF THE INVENTION

Figure 1:
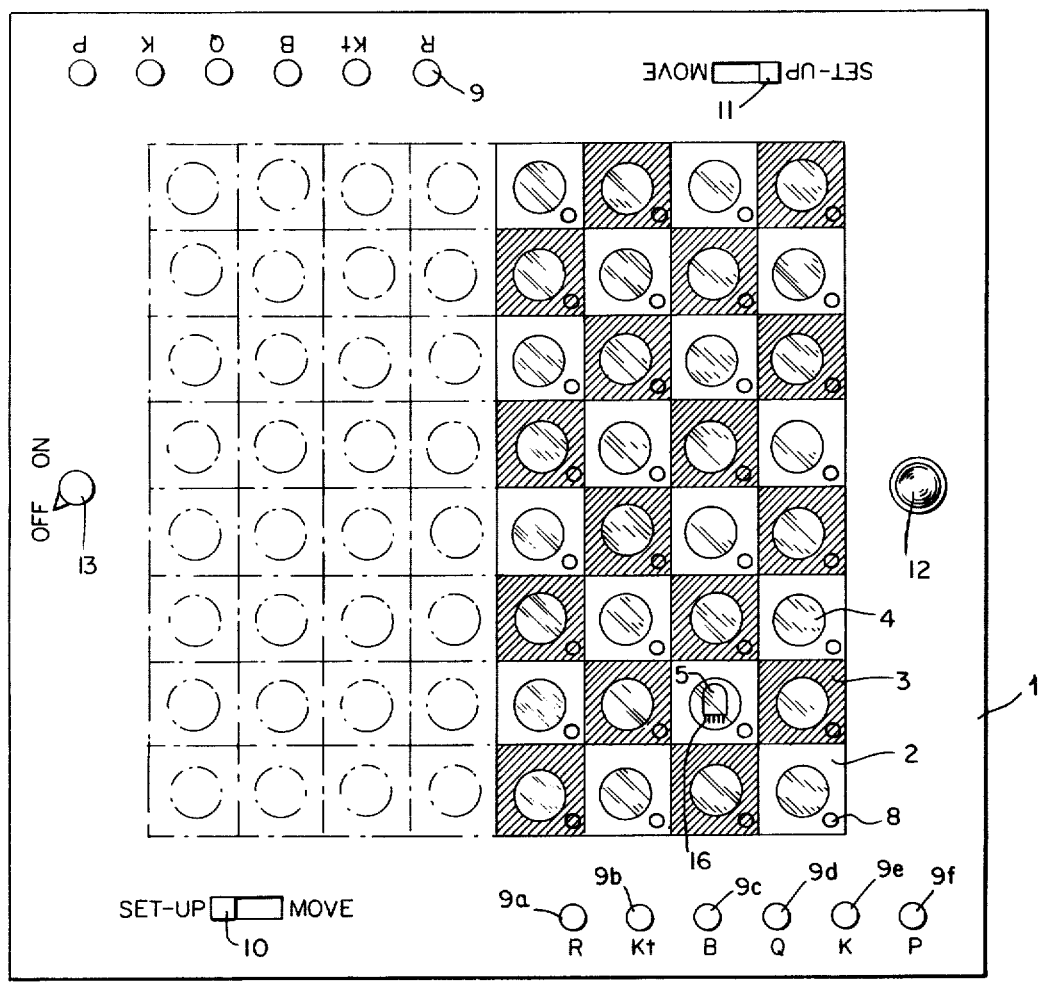
FIG. 1 is a plane view of a chess board console.

In FIG. 1 there is shown a chess board console which may be used either as a self-contained unit or in conjunction with a similar console remotely located. In either case logic circuitry of the general type hereinafter described would be incorporated. Referring to FIG. 1, the console 1 includes a novel representation of a 64-square chess board with the usual alternation of white squares 2 and black squares 3. Each square has a transparent central portion 4. Multifilament display tubes 5 are positioned under the transparent portions 4 and are mounted in a plane for the display of the particular filament which is energized as viewed through the transparent portion 4. The pins 6 of display tubes 5 are connected to appropriate leads coming from decoder 7 of FIG. 4. Each of the 64 squares of the board is provided with a push button switch 8 which is biased normally off, thus providing means for momentarily closing electrical contacts at each square of the board. Similar push button switches 9 are provided for selection of particular piece displays which are designated opposite the individual switches 9. Slide switches 10 and 11 are mounted on console 1 for selection of either the "set-up" mode or the "move" mode. Lamp 12 is mounted centrally and to one side of the board area for indication of illegal or improper moves. Switch 13 is mounted centrally and to the other side of the board area for turning the logic and display circuitry on and off.

Figure 2:
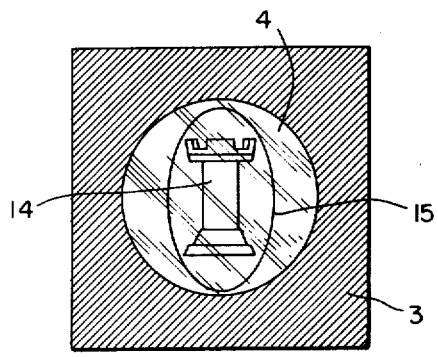
FIG. 2 is an enlarged view of a single square of the chess board of FIG. 1 showing the display of a rook and the display of an ellipse surrounding the rook to indicate a black piece.
Figure 3:
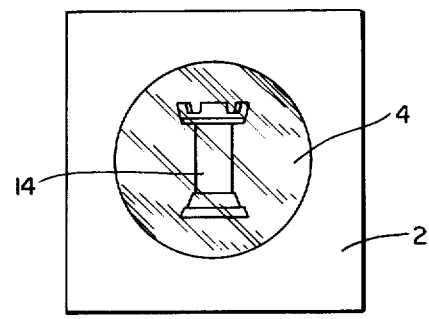
FIG. 3 is an enlarged view of a single white square showing the display of a white rook.

FIGS. 2 and 3 depict a black square and a white square, respectively, enlarged to approximately actual size with one filament 14 (the rook display) visible beneath the transparent section 4 of each enlarged square. In addition, the display at FIG. 2 shows an ellipse 15 to designate the rook display of FIG. 2 as being a black rook. The display at FIG. 3 is lacking an ellipse and, therefore, indicates a white rook.

Figure 4:
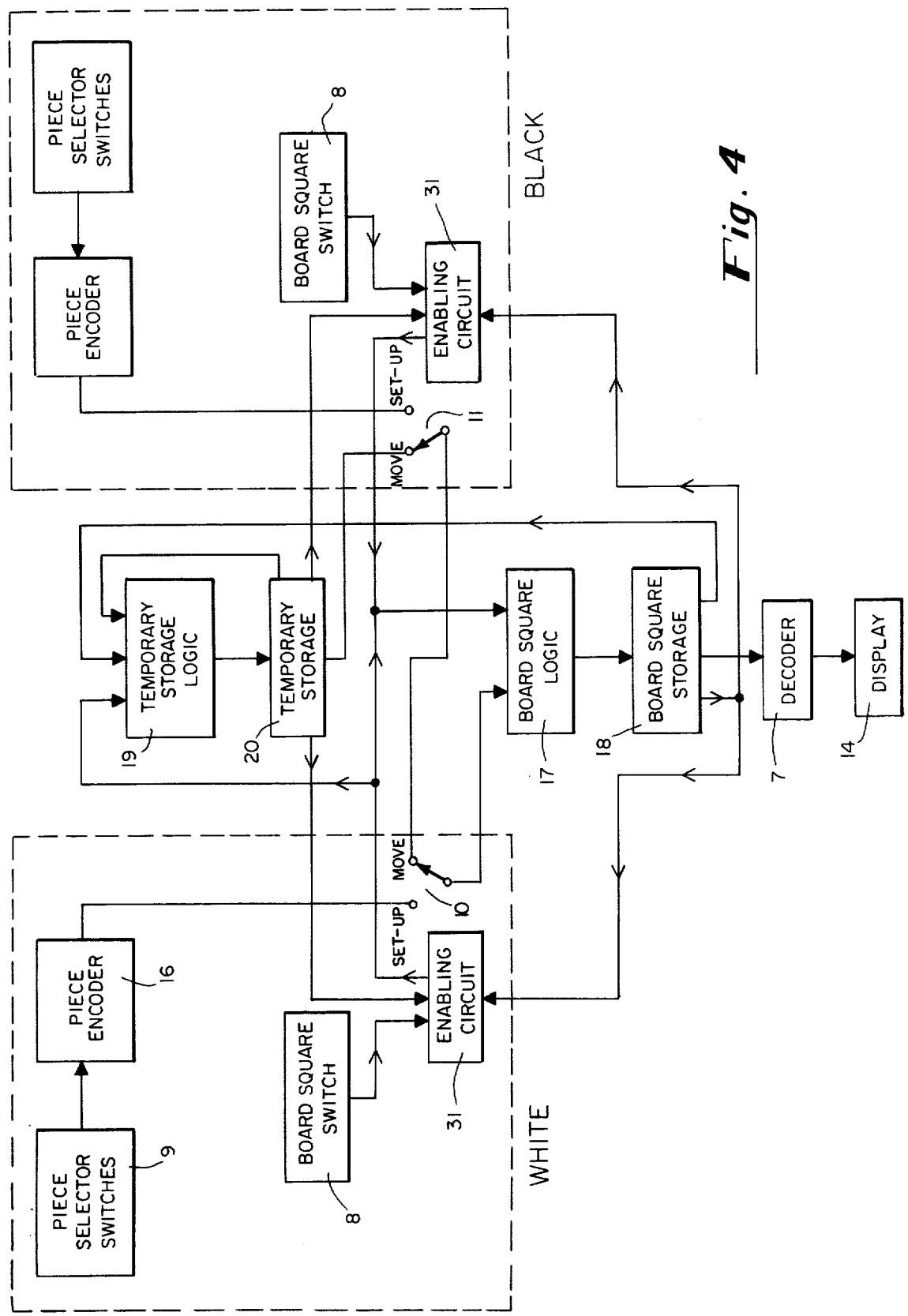
FIG. 4 is a block diagram showing the operative elements and the logic and storage units of interconnected white and black sides.

FIG. 4 is a block diagram showing the logic circuitry as it relates to the operative elements shown in FIG. 1. In the dotted square to the left of FIG. 4 is shown, in block form, piece selector switches 9, piece encoder 16 and board square switches 8 for the side playing the white pieces with similarly designated switches and encoder in the dotted square to the right for the side playing the black pieces. Also shown in the dotted squares are the white set-up or move mode switch 10 and the black set-up or move mode switch 11. With the switches 10 and 11 the set-up position the flow of information in the block diagram of FIG. 4 is from the piece selector switch 9 to the piece encoder 16 and thence to board square logic 17 to board square storage 18, to decoder 7 and thence through a suitable driver, not shown, to display 14. With switches 10 and 11 in the move position, the flow of information is from the board square switch 8 with the aid of the information is from the board square switch 8 with the aid of the enabling circuit 31 to temporary storage logic 19 to temporary storage 20 and thence through switches 11 and 10 to board square logic 17 and board square storage 18. Information from board square storage 18 is directed back to temporary storage logic 19 and also to display 14 through decoder 7. Information from temporary storage 20 and board square storage 17 is directed back to the enabling circuit 31 so that this circuit may "determine" whether to allow information to pass. Information is also directed back from the temporary storage 20 to the temporary storage logic 19 so that the temporary storage will be cleared automatically upon completion of a move.

Figure 5:
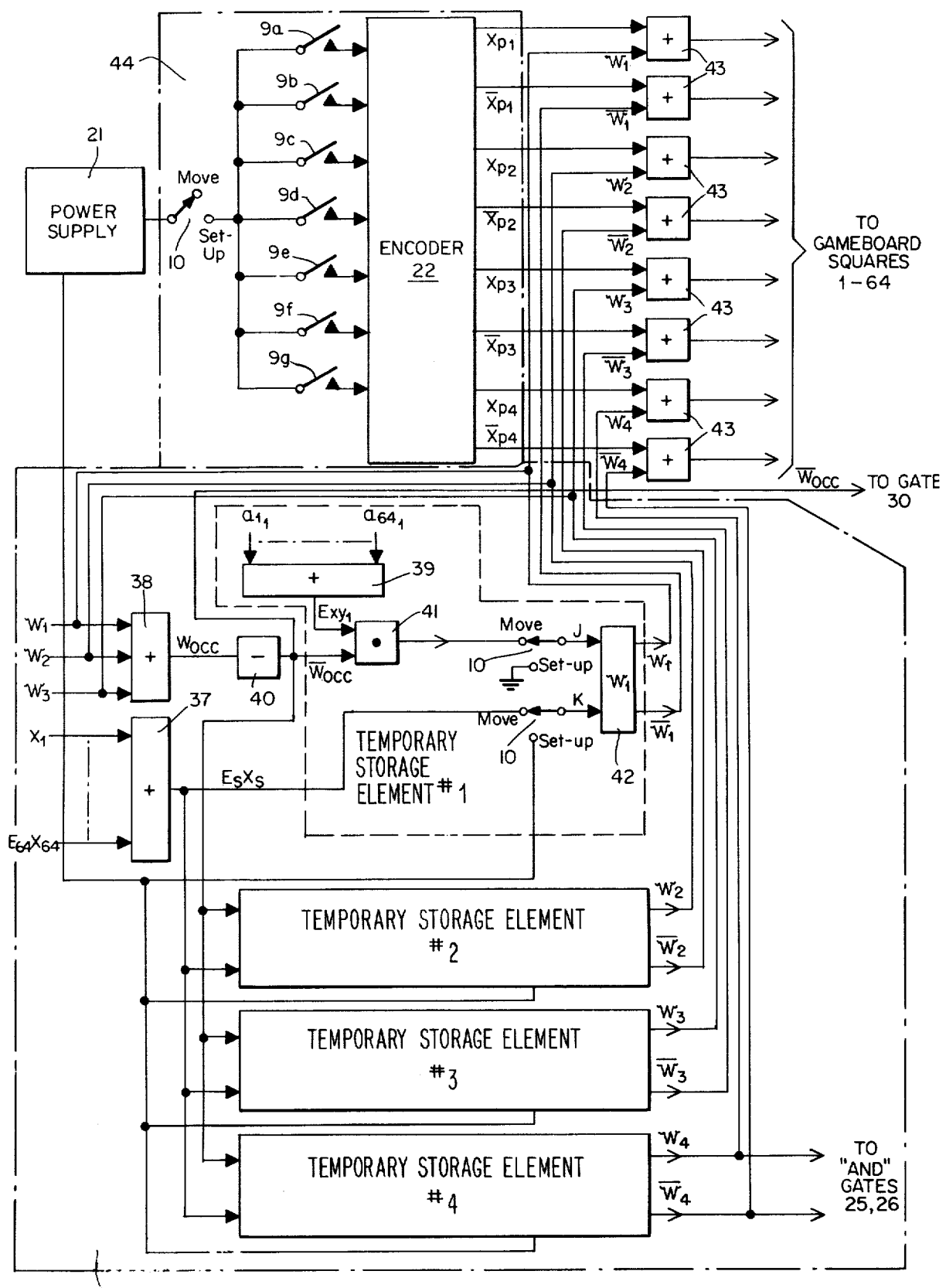
FIG. 5 is a block diagram of the set-up unit, the logic circuitry and storage means of the temporary storage, their interconnection, and the connection to the game board squares.

FIG. 5 illustrates one of the two identical set-up units 44 which are connected to a suitable voltage supply 21 which may be a battery or a rectifier or a one-shot circuit. Switch 10 is provided to select between the move and set-up modes. With switch 10 in the set-up position the signals at temporary storage elements 42 are held to zero. It is then possible to select the desired piece through operation of switches 9a to 9f. Designation of black is accomplished through operation of switch 9g. The pulse from the selected switch is fed to encoder 22 which output eventually goes to the appropriate filament of the display unit 5 (see FIG. 1) at the chess board. Buffer gates 43 pass the encode piece information to each of the game board squares.

Encoding of the piece information may be accomplished in any of the ways known to the art, such as providing multiple contact push buttons. The four bit binary system provided lends itself to many different codings. For example in chess, the six piece representations which are required might be coded as follows:

| | |
|---|---|
| King | $X_{p1}, X_{p2}, \overline{X}_{p3}$ |
| Queen | $X_{p1}, \overline{X}_{p2}, X_{p3}$ |
| Bishop | $\overline{X}_{p1}, X_{p2}, X_{p3}$ |
| Knight | $\overline{X}_{p1}, \overline{X}_{p2}, X_{p3}$ |
| Rook | $\overline{X}_{p1}, X_{p2}, \overline{X}_{p3}$ |
| Pawn | $X_{p1}, \overline{X}_{p2}, \overline{X}_{p3}$ |

Color or player designation would be accomplished by the fourth bit, "white" pieces being designated $\overline{X}_{p4}$ and "black" pieces $X_{p4}$. An unoccupied square's information code would be $\overline{X}_{p1}, \overline{X}_{p2}, \overline{X}_{p3}, \overline{X}_{p4}$.

Figure 6:
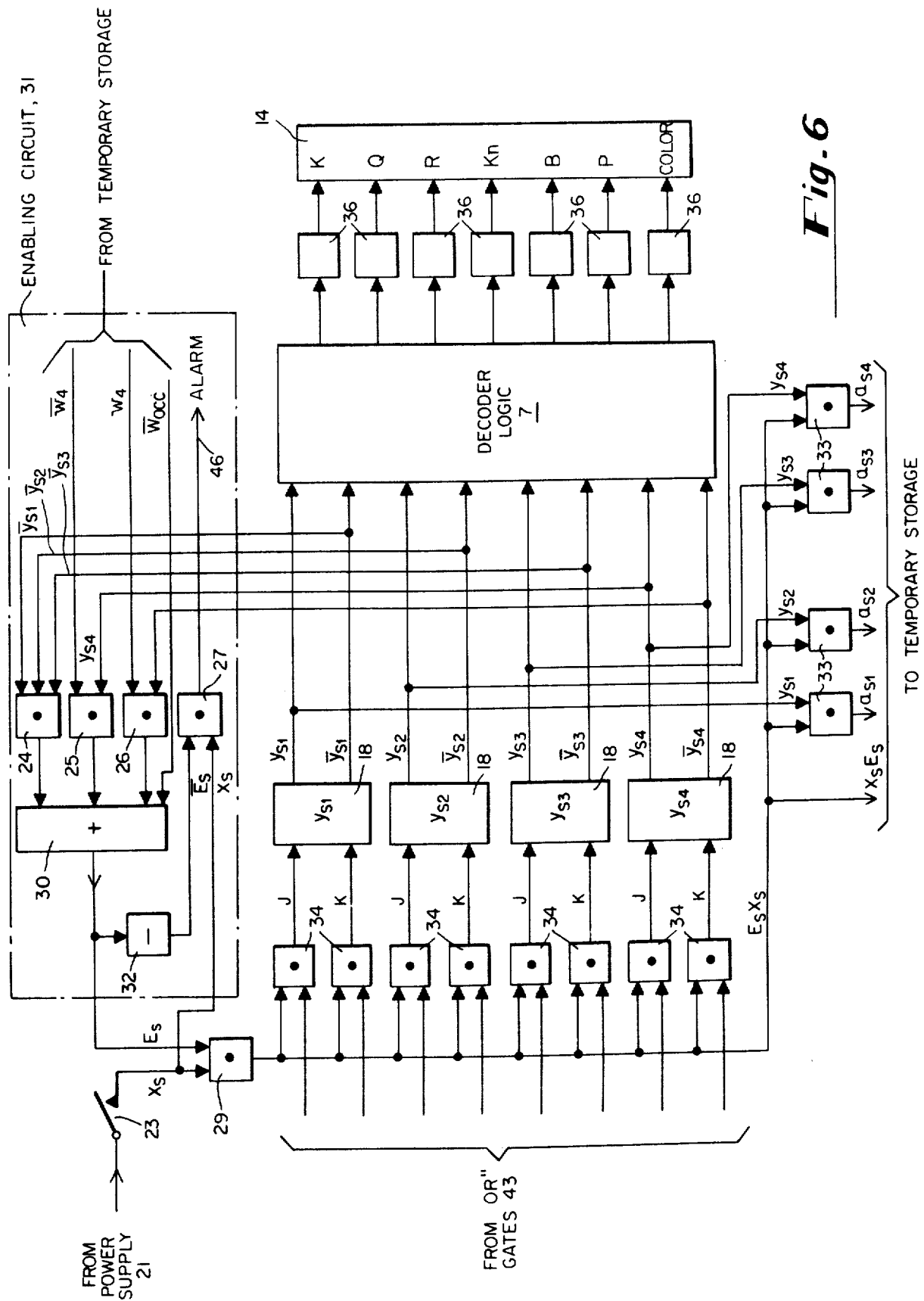
FIG. 6 is a block diagram of the board square storage and display logic.

As shown in the drawings, FIG. 6 represents the circuitry and bistable storage means provided for each of the 64 squares and includes a driver 36 for each of the seven shaped-metal cathodes 14 located in each of the 64 Nixie tubes. Depressing board square push button 23 provides power from the one shot power supply 27 or 29. Whether the display circuitry eventually is activated depends on the output of the enabling circuit 31. One of the purposes of the enabling circuit is to sense whether the destination square is occupied by a piece of the same color as that being moved. This determination is made by comparing output information from board square storage $\overline{Y}_{s1}$, $\overline{Y}_{s2}$, $\overline{Y}_{s3}$, $Y_{s4}$, $\overline{Y}_{s4}$, and from temporary storage $\overline{W}_4$, $W_4$, $\overline{W}_{occ}$. If the board square storage information indicates a vacant square as detected by logic "and" gate 24, circuitry beyond gate 29 will be achieved. Color comparisons are accomplished through logic gates 25 and 26. If the square is occupied by a piece of the opposite color gate 30 will allow the circuitry beyond gate 29 to be activated. If neither gates 24, 25 nor 26 are activated then voltage will pass through gate 30 only if the $\overline{W}_{occ}$ input indicates that the temporary storage is empty, as it will be at the beginning of a move, otherwise gate 29 will prevent activation of the display circuitry and complement gate 32, combined with the voltage produced by the depression of switch 23, will activate gate 27 to sound an alarm 46. This alarm will indicate to the player attempting to move that the desired destination is occupied by a piece of the same color.

Depressing a board square push button produces one of two display results depending on which stage the move is in. The first stage of a move consists of the depression of the board square button for the square at which a piece is shown which the player desires to move. Since the bistable temporary storage memory elements 42 are empty following completion of a prior move, the temporary storage data indicating a vacant square is allowed to combine with the push button voltage ($E_sX_s$) to act upon "and" gates 34, which in turn change the board square storage 18. This information ($\overline{Y}_{s1}$, $\overline{Y}_{s2}$, $\overline{Y}_{s3}$, $\overline{Y}_{s4}$) is passed on to the decoder logic 7, and then the display drivers extinguish the display 14. The push button voltage ($E_sX_s$) simultaneously combines with the "old" board square storage data to transfer the identity of the piece previously shown on the square through gates 33 to the temporary storage input. Each of the four outputs ($A_{s1}$, $A_{s2}$, $A_{s3}$, $A_{s4}$) for a given square (denoted "sub S") goes to the respective temporary storage element and "or" gate 39, which collects information from all 64 squares. The result of depressing the push button for a square in which a piece is located is that the piece information is transferred to the temporary storage input, and the display is extinguished leaving the square unoccupied.

The second stage of the move consists of depressing a board square push button for the desired destination of the piece selected in the first stage of the move. As described previously, in the second stage of the move the selected destination must either be empty or be occupied by a piece with an opposite color, otherwise an alarm will sound and another selection must be made. The second stage proceeds in a similar manner to the first. Data from the temporary storage memory is transferred through gates 43 and 34 to board square storage 18 composed of bistable elements such as JK Flip-Flops which pass the information to the decoder logic 7 then to the display drivers 36 and the Nixie tube display 14.

Once again the information in board square storage 18 is transferred through logic gates 33 to the temporary storage input. Thus the effect of the second stage of the move is to replace the piece displayed in the destination square, if any, with the piece which was selected in the first stage of the move.

Temporary storage circuitry 45 (FIG. 5) is a block diagram showing the arrangement of the temporary storage memory. Although only one storage element of the temporary storage memory is shown in detail, four such elements, as indicated by boxes labeled "temporary storage elements No. 2 – No. 4", are required to complete storage of the piece data. The purpose of this memory is to receive and hold data for a piece "in transit" from one square to the next. It must also reset at the completion of the second stage of the move to prevent introduction of a piece on the square to be vacated. In order to accomplish this result, logic gate 38 senses the existence of information ($W_1$, $W_2$, $W_3$) in the temporary storage memory. Switch 10, which is the multiple pole switch also shown in circuit 44, holds the temporary storage memory to zero during set up. During the first stage of the move the temporary storage memory will be empty. Consequently, gate 38 will not sense information $W_1$, $W_2$ or $W_3$. Complement logic gate 40 will enable gate 41 to pass information if it receives no information from gate 38. The information which gate 41 passes will be that information sent by gates 33 through gate 39 during the first stage of the move. Since $E_sX_s$ voltage will always be sent from the board square storage, during either stage of the move, JK Flip-Flop 42 will produce an output of $\overline{W}$, unless there is board square occupancy information transmitted through gate 41. Since it is the nature of the output of JK Flip-Flop to give a J output ($W_1$) if simultaneous pulses are received at both the J and K input poles, and since the temporary storage memory is always empty just prior to the first stage of the move, the net effect of this circuit in this stage of the move is to pass output information from the board square storage directly into temporary storage.

Depression of the destination board square button results in the transfer of information (which represents information concerning former occupancy of the destination square) through gates 33 to the temporary storage memory "or" gate input 39. This information, if any, need not be saved, as it represents the playing piece which is "captured" and thus deleted from display on the game board. Since the temporary storage memory will always be occupied after the first stage of a move, complement logic gate 40 will inhibit transfer of this input information through logic gate 41 to the JK Flip-Flop 43. On the other hand, voltage $E_sX_s$ which passes through gate 37, will trigger JK Flip-Flop 42 resetting it to the zero ($\overline{W}_1$) position. Thus, the temporary storage memory will reset itself upon completion of the move since it always contains information prior to selection of the destination square.

As can be seen from the above, momentary closing of switches associated with squares on the game board provides for the selective display of the representation of any selected chess piece in real time. The pieces to be displayed at preselected squares are set up by selecting the "set up" mode and then consecutively designating the desired piece and the square at which it is to be displayed. During the play of the game, the "move" mode is selected and pieces are moved from one square to the next by consecutively selecting the piece to be moved and the destination at which that piece is to be displayed. A novel enabling circuit prevents the illegal introduction of a display image at a square prohibited by the rules of the game. Sophisticated logic circuitry facilitates remote direct participation in the playing of the game of chess or other board game in a completely natural manner without the technical difficulties or complexities which in the past have stood in the way of satisfactory playing of board games at remote locations.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent Office, and is not intended to limit the scope of the invention described and claimed herein.

We claim:

1. An electronic board game consisting of a playing board surface made up of a number of squares, display means for displaying at each of said squares an image of any one of those playing pieces required for the game, logic circuitry to permit each player of the game to selectively cause said images to be automatically transferred from one square to another, and means to selectively create or eliminate said images at preselected squares and wherein said logic circuitry comprises a number of board square memory elements, at least one for each square of the board, to store a coded representation of the image of the playing piece at that square and a decoding device, and wherein said representation is monitored by the display means for that square through the decoding device.

2. An electronic board game as described in claim 1, wherein said logic circuitry comprises at least one temporary storage memory element serving as a temporary storage for the coded representation of a playing piece being transferred from one square to another.

3. An electronic board game as described in claim 2, wherein said logic circuitry further comprises an enabling circuit to permit the transfer of an image to a destination square at which no image is currently displayed, and also to permit the transfer of an image to a destination square at which the image belonging to a opposing player is displayed.

4. An electronic board game as described in claim 3, wherein said enabling circuit monitors the coded representation of the playing piece whose image is displayed at said destination square, and wherein said enabling circuit additionally monitors the coded representation of the playing piece to be transferred to said destination square, and wherein said coded representations are compared within said enabling circuit for the purpose of inhibiting said transfer if both playing pieces belong to the same player.

5. The invention of claim 2, wherein said logic circuitry further comprises temporary storage logic circuitry serving to prevent the storage of coded representations of a first playing piece which has been captured as the result of the transfer of a second playing piece image belonging to another player to the square at which said first playing piece image was formerly displayed.

6. An electronic board game as described in claim 1, wherein said memory element is implemented by a number of bistable devices, such as flip-flops, one for each code bit.

7. An electronic board game consisting of a playing board surface made up of a number of squares, display means for displaying at each of said squares an image of any one of those playing pieces required for the game, logic circuitry to permit each player of the game to selectively cause said images to be automatically transferred from one square to another, and means to selectively create or eliminate said images at preselected squares, wherein said logic circuitry further comprises:

a. a number of board square switches, at least one for each square on the board, which are used by the players to transfer playing piece images between preselected squares depending upon the sequence of activation of the switches;

b. a number of board square memory elements, at least one for each square of the board, to store a coded representation of the image of the playing piece at that square, and wherein said representation is monitored by the display means for that square;

c. at least one temporary storage memory element serving as a temporary storage element for the coded representation of a playing piece being transferred from one square to another;

d. a mode of play switch for selecting between said logic circuitry and said means to selectively create or eliminate said images at preselected squares; and e. an alarm and wherein said logic circuitry is designed to operate as follows:

i. in normal play, activating a board square switch when the temporary storage memory element is not storing any coded representation of a playing piece causes the coded representation of the playing piece in that square's memory element to be transferred to the temporary storage memory element; otherwise, the coded representation of the playing piece which is in the temporary storage memory element is transferred to the board square memory element associated with the switch activated, except as noted in (ii);

ii. if the board square memory element corresponding to the switch activated and temporary storage memory element are both occupied by a coded representation of a playing piece, then the image in the temporary storage memory element replaces that in the board square memory element, in effect, a "capture," unless both coded representations are of pieces belonging to the same player, in which case the transfer is inhibited and the alarm is activated; and iii. operation of the mode of play switch from a first normal position to a second position facilitates simultaneous operation of a player's piece switch and a preselected board square switch to cause the image of the piece selected to replace that on the chosen square; if no piece is selected, the image on the square, if any, is erased.

8. An electronic board game as described in claim 7, wherein the memory elements are implemented by a number of bistable devices, such as flip-flops, one for each code bit.

9. An electronic board game consisting of a playing board surface made up of a number of squares, display means for displaying at each of said squares an image of any one of those playing pieces required for the game, logic circuitry to permit each player of the game to selectively cause said images to be automatically transferred from one square to another, and means to selectively create or eliminate said images at preselected squares and wherein said logic circuitry represents the playing piece image by a binary code within the electronic logic of the game, one bit of which is used to identify the player to whom the pieces belong.

* * * * *